United States Patent
Savagaonkar et al.

(10) Patent No.: US 9,442,864 B2
(45) Date of Patent: Sep. 13, 2016

(54) BRIDGING CIRCUITRY BETWEEN A MEMORY CONTROLLER AND REQUEST AGENTS IN A SYSTEM HAVING MULTIPLE SYSTEM MEMORY PROTECTION SCHEMES

(71) Applicant: Intel Corporation, Santa Clara, CA (US)

(72) Inventors: Uday R. Savagaonkar, Portland, OR (US); Siddhartha Chhabra, Hillsboro, OR (US); Men Long, Beaverton, OR (US); Alpa T. Narendra Trivedi, Hillsboro, OR (US); Carlos Ornelas, Guadalajara (MX); Edgar Borrayo, Zapopan (MX); Ramadass Nagarajan, Portland, OR (US); Stanley S. Kulick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/142,117

(22) Filed: Dec. 27, 2013

(65) Prior Publication Data

US 2015/0186295 A1  Jul. 2, 2015

(51) Int. Cl.
*G06F 12/14* (2006.01)
*G06F 21/74* (2013.01)

(52) U.S. Cl.
CPC ....... *G06F 12/1408* (2013.01); *G06F 12/1441* (2013.01); *G06F 21/74* (2013.01); *G06F 2212/1052* (2013.01)

(58) Field of Classification Search
CPC ....... G06F 12/14; G06F 21/60; H04L 9/002; H04L 63/1441; H04L 29/06877
USPC ............................................ 713/193
See application file for complete search history.

(56) References Cited

U.S. PATENT DOCUMENTS 6,138,230 A   10/2000  Hervin et al.
7,761,717 B2 *  7/2010  Moller ............... G06F 21/572
                                                       380/255

(Continued)

FOREIGN PATENT DOCUMENTS

TW     201112853 A    4/2011
TW     201116009 A    5/2011
WO     2013/100965 A1  7/2013

OTHER PUBLICATIONS

Krawczyk et al., HMAC: Keyed-Hashing for Message Authentication, Feb. 1997, Network Working Group RFC 2104, pp. 1-11.*

(Continued)

*Primary Examiner* — Peter Shaw
(74) *Attorney, Agent, or Firm* — Nicholson De Vos Webster & Elliott, LLP (57) ABSTRACT

A processor is described that includes one or more processing cores. The processor includes a memory controller to interface with a system memory having a protected region and a non protected region. The processor includes a protection engine to protect against active and passive attacks. The processor includes an encryption/decryption engine to protect against passive attacks. The protection engine includes bridge circuitry coupled between the memory controller and the one or more processing cores. The bridge circuitry is also coupled to the protection engine and the encryption/decryption engine. The bridge circuitry is to route first requests directed to the protected region to the protection engine and to route second requests directed to the non protected region to the encryption/decryption engine.

16 Claims, 7 Drawing Sheets

(56) References Cited

U.S. PATENT DOCUMENTS

| | | |
|---|---|---|
| 9,053,346 B2 | 6/2015 | Chhabra et al. |
| 2002/0051536 A1* | 5/2002 | Shirakawa et al. ............ 380/45 |
| 2002/0169942 A1 | 11/2002 | Sugimoto |
| 2003/0044007 A1 | 3/2003 | Matthews |
| 2006/0155792 A1* | 7/2006 | Inoue et al. ................. 707/206 |
| 2006/0277395 A1 | 12/2006 | Fowles |
| 2008/0301796 A1* | 12/2008 | Holostov ............. H04L 63/105 726/12 |
| 2009/0019317 A1 | 1/2009 | Quach et al. |
| 2009/0240919 A1 | 9/2009 | Alexander et al. |
| 2010/0250965 A1 | 9/2010 | Olson et al. |
| 2011/0072242 A1 | 3/2011 | Lee et al. |
| 2011/0289306 A1* | 11/2011 | Khosravi ............. G06F 21/567 713/2 |

OTHER PUBLICATIONS

Notice of Allowance from U.S. Appl. No. 13/976,930, mailed Feb. 9, 2015, 15 pages.

PCT/US2011/067590 Notification of Transmittal of the International Search Report and the Written Opinion of the International Searching Authority, mailed Aug. 27, 2012, 8 pages.

PCT/US2011/067590 Notification Concerning Transmittal of International Preliminary Report on Patentability, mailed Jul. 10, 2014, 5 pages.

Office action with summarized English translation from Taiwan Patent Application No. 101149324, mailed Feb. 13, 2015, 9 pages.

Office action with English translation from Taiwan Patent Application No. 101149324, mailed Sep. 30, 2015, 7 pages.

\* cited by examiner

BRIDGING CIRCUITRY BETWEEN A MEMORY CONTROLLER AND REQUEST AGENTS IN A SYSTEM HAVING MULTIPLE SYSTEM MEMORY PROTECTION SCHEMES

FIELD OF INVENTION

The field of invention relates generally to computing systems, and, more specifically, to bridging circuitry between a memory controller and request agents in a system having multiple system memory protection schemes.

BACKGROUND

Figure 1:
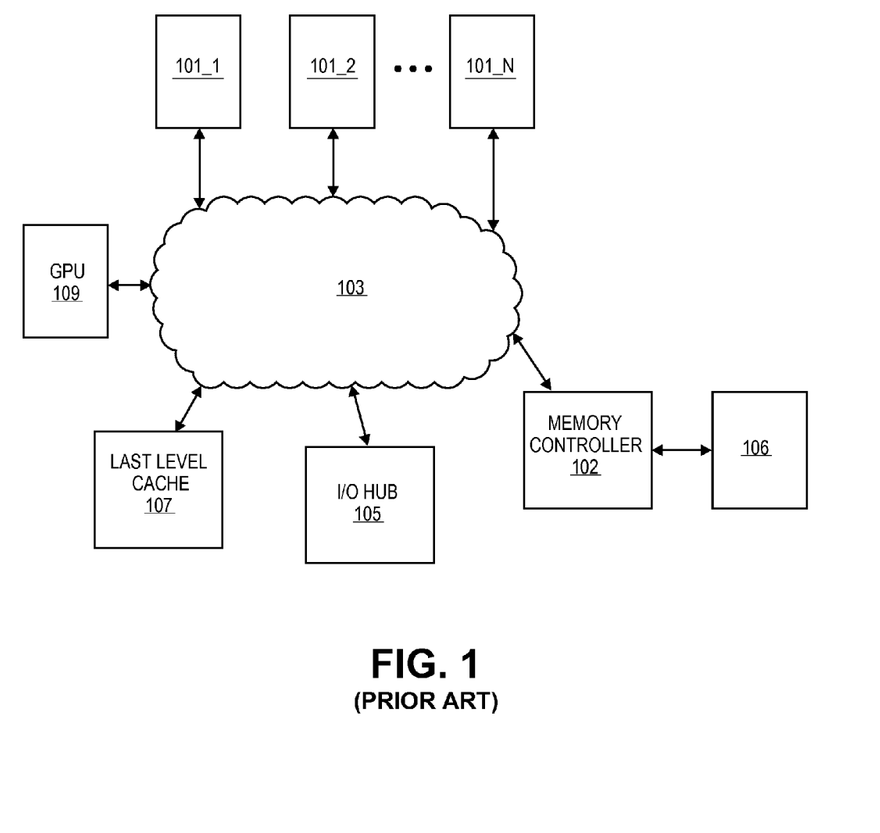
FIG. 1 shows a computing system (prior art)

FIG. 1 shows an embodiment of a computing system (e.g., a computer). The computer includes processing cores 101_1 to 101_N. Each processing core includes at least one instruction execution pipeline to execution instructions. The processing cores 101_1 to 101_N communicate to one another and a memory controller 102 through an interconnection network 103. A graphics processor 104 can be coupled to the interconnection network 103 or the memory controller 102 directly. Likewise, an I/O hub 105 can be coupled to the interconnection network 103 or the memory controller 102, directly. The memory controller is coupled to a system memory 106.

In operation, any one of the processing cores 101_1 to 101_N can invoke system memory 106 to store the instructions of the various software programs that the processing cores 101_1 to 101_N execute as well as the specific data that the software programs operate on. With the instructions and data being kept in system memory 106, the processing cores 101_1 to 101_N will need to access system memory 106 in order to fetch the same at appropriate times. Moreover, as the software programs operate on data they may likewise change existing data or create new data that is ultimately written into system memory 106. Here, multiple caching levels may reside between a processing core's instruction execution pipeline(s) and system memory 106. A typical memory access sequence therefor includes snooping the various levels of cache for a valid cache line having the targeted system memory address. If no such cache line is found after a last level cache 107 is snooped, a memory access request is issued from the last level cache 107 to the memory controller 102.

A single "processor" may include the multiple processing cores 101_1 to 101_N and any/all of the other components depicted in FIG. 1 in various combinations. Multiple such processors may be coupled together (e.g., through an extension of network 103) to form a single computing system (here the system memory of each processor holds a "slice" of the total system memory address space).

Figure 2A:
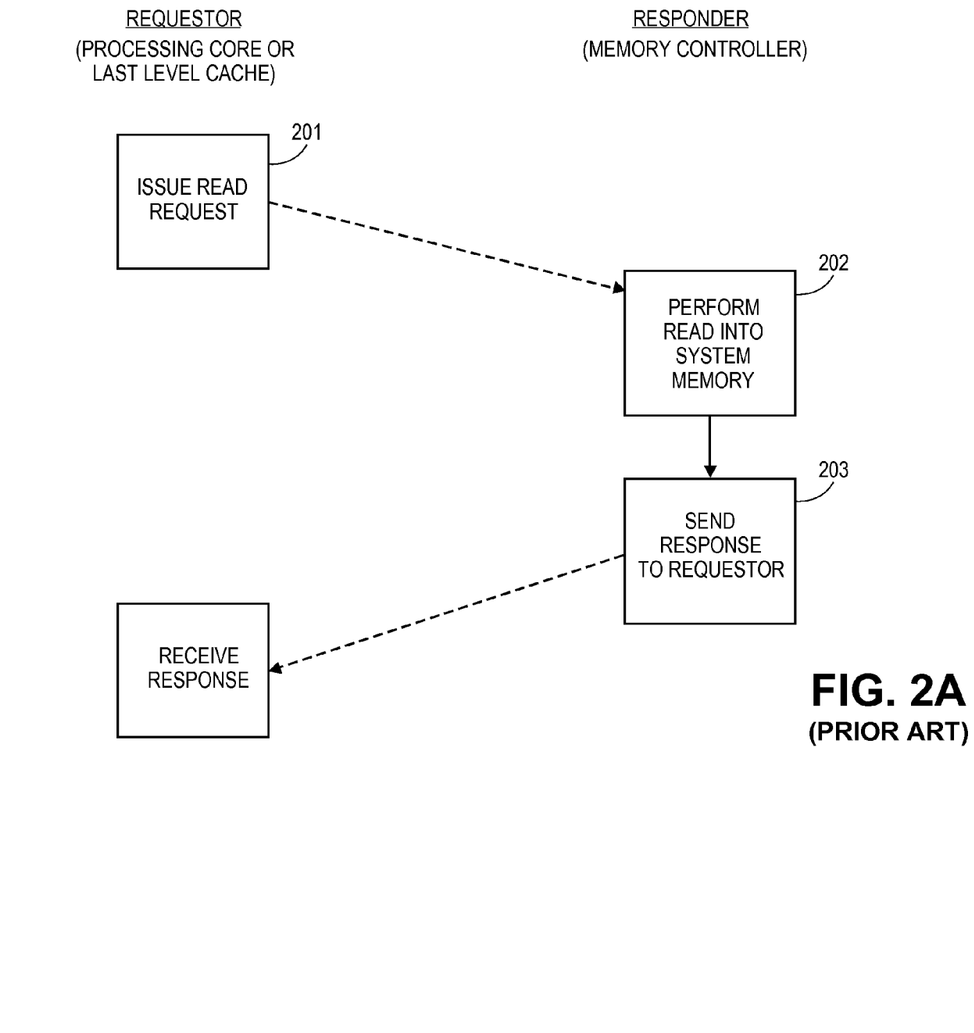
FIGS. 2a and 2b show request/response sequences (prior art)

FIG. 2a shows a typical prior art process to provide instructions or data to a processing core from system memory. As observed in FIG. 2a the processing core is viewed as a "requestor" that issues a request 201 to a memory controller. Alternatively, the request may first progress through various levels of cache until each snooped cache has resulted in a miss requiring the request to proceed to the memory controller. The request includes a tag and a system memory address. The memory controller receives the request and ultimately performs a read into system memory 202 specifying the address in the request as the address for the read operation. After the memory responds with the requested information, the memory controller sends a response 203 back to the processor that includes the requested information and the tag that was included in the original request. With the tag, the processor is able to correlate the received information as the information retrieved from the address specified in the original request. Note that the process of FIG. 2a is used to fetch both software instructions and data.

Figure 2B:
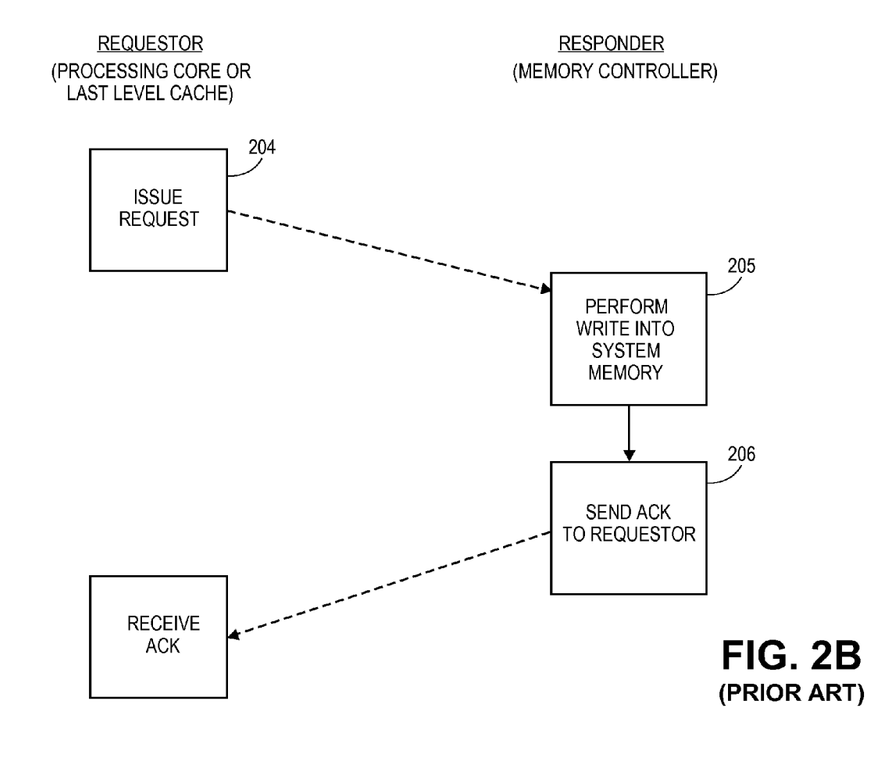

FIG. 2b shows a typical prior art process to write information from a processor into system memory. Again the processor is viewed as a requestor that issues a request 204 to a memory controller. The request includes a tag, a system memory address and the information to be written. The memory controller receives the request and ultimately performs a write into system memory 205 where the information received with the request is written into system at the address that was also included in the request. Upon a successful write operation into system memory, the memory controller sends a response to the processor 206 that includes the tag included in the original request and an acknowledgement that the write was successful. Here, whether or not an acknowledgement is sent upon a successful write is memory interfaces dependent. Some memory interfaces support such an acknowledgement while others do not.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Computer and processor manufacturers are interested in improving the security of computing system hardware platforms. A few approaches propose protecting information that is stored in system memory.

Secure Enclave Protection

Figure 3:
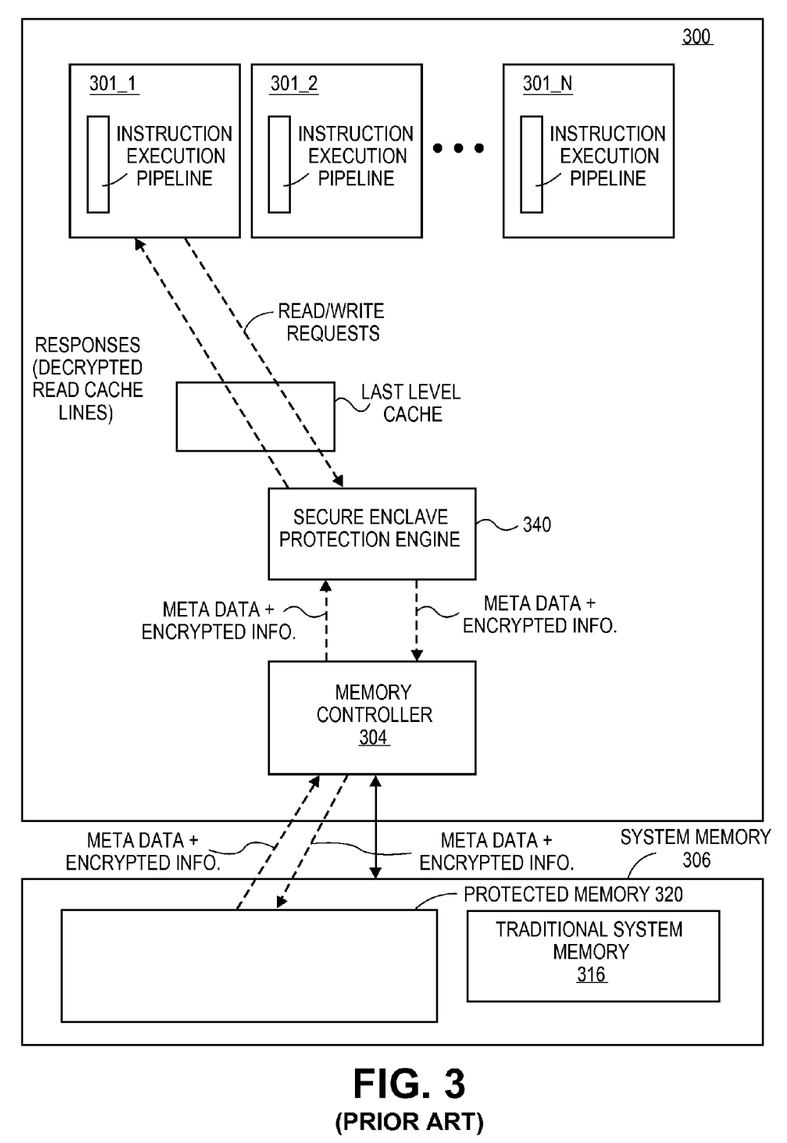
FIG. 3 shows an embodiment of a processor having a protected region of system memory for the private use of a thread (prior art)

FIG. 3 shows an embodiment of a processor 300 implemented on a semiconductor chip. According to one type of security approach, a version of which is referred to as "secure enclave" or Software Guard Extensions (SGX) by Intel Corporation of Santa Clara, Calif. and which is depicted in FIG. 3, an application software thread is given a secure executional environment by providing it with private storage space (referred to as an enclave page cache (EPC)) within a protected region 320 of system memory 306. The EPC holds both instructions and data for the threads that execute out of the EPC 320. As observed in the approach of FIG. 3 there is one EPC 320 shared between all the processing cores 301_1 through 301_N. System memory 306 is therefore is viewed as having two components: 1) a protected region 320 called the EPC; and, 2) another region 316 that behaves as traditional or "regular" system memory. The protected EPC region 320 is a region of system memory 306 whose address space is not made generally available. The traditional region 316 of system memory 306 is a region of system memory whose address space is made generally available. The traditional region 316 of system memory can also be referred to as a regular or non protected region of system memory 306.

According to one approach, an application thread's instructions and data are called into the EPC 320 as respective pages of instructions and data. That is, instructions are viewed as being stored on an instruction page within the EPC 320 and data is viewed as being stored on a data page within the EPC 320. The sizes of the pages themselves may be typically smaller than the amount of instructions and data that the application thread may wish to execute in a secure fashion. Hence, a single application thread may utilize multiple such pages in the EPC 320 over the course of its execution.

In an implementation, no software process is able to access the information kept on a page in the EPC other than the thread to which the page belongs. For instance, no lower level (e.g., operating system (OS) or BIOS) process is permitted to access an application thread's page of data within the EPC 320. By so doing, the information processed by the application (which may include sensitive information that the application operates upon) is secure from any external software process including malware, spyware or other unwanted process that desires access to the information. The EPC 320 may, at any instant of time, be partitioned to store respective pages of more than one thread executing on same and/or different cores so that multiple threads can concurrently execute in a secure fashion out of the EPC 320. In this case, no such thread can access another thread's information.

Although an OS cannot read or modify a thread's data in the EPC 320, in an implementation, an OS does control which pages are called into the EPC. The OS may also choose to evict an application's pages from the EPC (e.g., to make room for another application's pages). Here, the processor 300 offers a set of "secure enclave" instructions that are executed by the OS to manipulate the pages, e.g., as described just above. An exemplary set of such secure enclave instructions include instructions used to build and enable a secure enclave (e.g., ECREATE, EADDPRE, EADDPOST, EINIT); instructions used to dynamically manipulate enclave page attributes (e.g., EMODIFY, EREMOVE); instructions used to manage the EPC (e.g., ELPG, EWBINVPG, EADDSMAP, EUPSMAP); instructions used to read and write the contents of an enclave, e.g., for debugging purposes (e.g., EDBGRD, EDBGWR); and, instructions to read information about EPC entries (e.g., ERDINFO). U.S. patent application Ser. No. 12/972,406 (U.S. Pub. Pat. App. No. 2012/0159184) provides more information on each of these instructions.

When an EPC page is switched out of the EPC 320 and stored into the "traditional" system memory region 316, protection engine 340 within the processor hardware 300 decrypts the page as it is read from the EPC 320. The decrypted page is then re-encrypted elsewhere in the processor 300 and stored into traditional system memory 316. Contra-wise, when an EPC page is switched into the EPC 320 from the traditional region 316 of system memory 306, the page is first read from the traditional region 316 of system memory 306, decrypted elsewhere in the processor and then passed to the protection engine 340. The protection engine 340 then encrypts the content of the page before it is written into the EPC 320.

When a thread is executing out of the EPC 320, the protection engine 340 not only provides encryption/decryption services on the write/read requests between the core that is executing the thread and the EPC 320 but also provides "active attack" protection services as well. Encryption is sufficient to protect against "passive" attacks (mere observance) but not active attacks. Active attacks attempt to not only reach but also change program code and/or its data.

In order to protect against active attacks, in an embodiment, a memory authentication mechanism is used. Here, the protection engine 340 generates a Message Authentication Code (MAC) with the ciphertext of a cache line's data before the cache line is written into its EPC. The MAC is written into the EPC along with the cache line. In order for an attacker to conduct a successful attack, the cache line along with its MAC must be replayed together. When the cache line is loaded from the EPC 320, its MAC is verified by the protection engine 340 to ensure that the data line was not modified while resident in the EPC.

As such, when a thread that is executing out of the EPC 320 and issues a write request for a cache line of data or program code (which is typically originally issued from a processing core but directly issues from a last level cache), the protection engine 340 not only encrypts the cache line but also generates meta data associated with the MAC that is stored in the EPC 320 along with the encrypted cache line. Upon a later read request issued by the thread for the cache line, the meta data is read from the EPC 320 and the protection engine 340 processes it to ensure that there was no active attack. If there was no active attack, the requested cache line is read from the EPC 320 and the protection engine 340 decrypts the cache line. The decrypted cache line is then forwarded to the requesting thread. In an alternate implementation, the requested cache line is actually read out of the EPC before the meta data. The meta data is processed commensurate with the decryption and forwarding of the requested cache line toward the requesting thread but is not formally given to the requesting thread until the meta data is fully processed and the lack of an active attack has been verified. If an active attack is verified the cache line is prevented from being given to the requesting cache line.

In an embodiment, the protection engine 340 also generates/processes meta data for active attack protection for pages that are moved to/from the EPC 320 from/to the traditional region 316 of system memory 306.

In alternate embodiments, there may be multiple EPCs. For example, there may be one EPC per processing core or one EPC for less than all processing cores on the processor. Alternatively, there may be an EPC per hardware thread, or even, an EPC per software thread. Hardware threads are understood to be the threads actively being executed within an instruction execution pipeline. Instruction execution pipelines are typically designed to concurrently execute a maximum/limited number of hardware threads where the maximum/limit is set by the hardware design of the pipeline. A software thread is understood to be a singular stream of program code instructions. The number of software threads supported by a processor can greatly exceed the number of hardware threads. A software thread is recognized as also being a hardware thread when the thread's state/context information is switched into an instruction execution pipeline. The software thread loses its hardware thread status when its state/context is switched out of the instruction execution pipeline.

Total Memory Encryption

Figure 4:
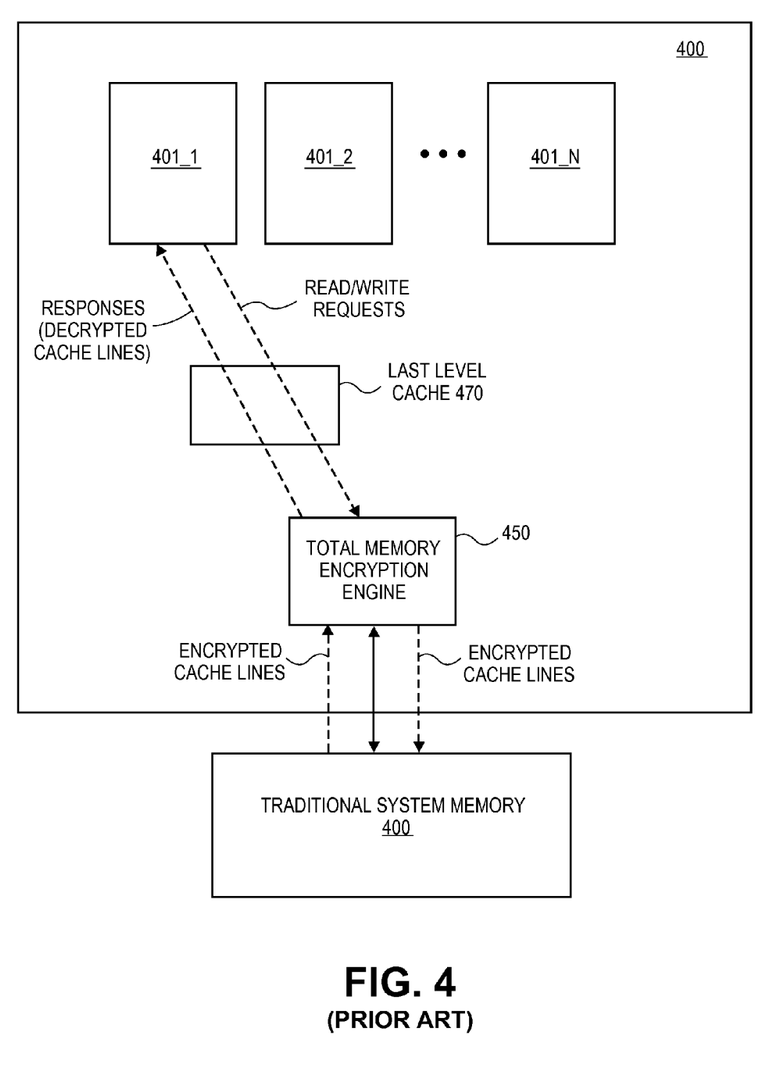
FIG. 4 shows an embodiment of a processor that can encrypt/decrypt regular memory writes and regular memory reads.

According to another type of security approach, referred to as "total memory encryption" which is depicted in FIG. 4, the processor hardware 400 includes an encryption/decryption engine 450 that encrypts data that a processing core 401 or last level cache 470 has requested to be written into a traditional system memory 406 before it is written therein. Contra-wise, when a processing core 401 or last level cache 470 requests that data be read from the traditional system memory 406, the encryption/decryption engine 450 decrypts the data after it is read from the traditional system memory 406 but before it is delivered to the processing core 401 or last level cache 470.

As opposed to the "secure enclave" approach of FIG. 3, which more globally "protects" information within the EPC 320 not only from passive but also active attacks, by contrast, the "total memory encryption" approach only protects against passive attacks (via encryption and decryption) but provides that protection to (e.g., all) memory accesses to a traditional system memory 406. As such, total memory encryption protects standard instruction and data fetches and write requests. Note that in many cases the actual read and write requests directed to the traditional system memory 406 will issue from a last level cache 470 rather than a processing core 401 directly because a typical memory access issued by a processing core will snoop multiple caching levels before finally requesting access to the traditional system memory 406 if a valid cache line having the targeted memory address is not found in any of the caching levels.

Figure 5:
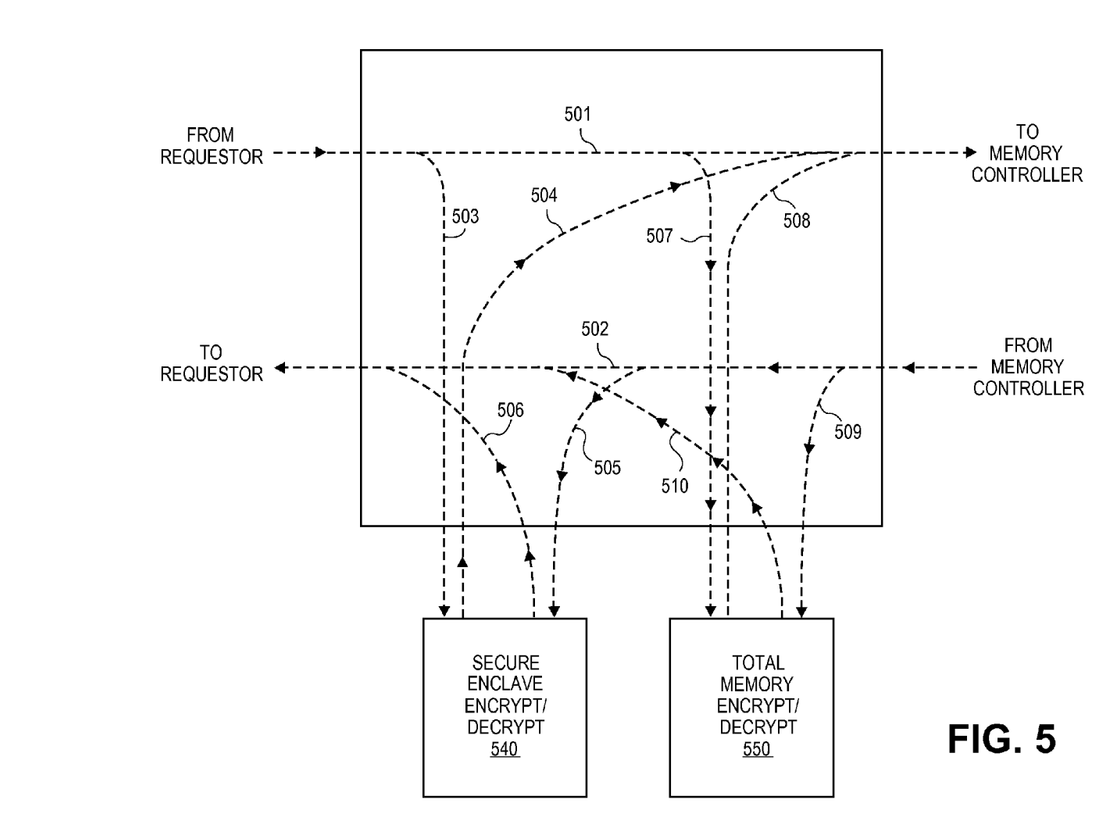
FIG. 5 shows different routing paths of bridge circuitry.

Processor that Supports Both Secure Enclave Protection and Total Memory Encryption Conceivably a processor may be desired that is designed to include support for "secure enclave" and "total memory encryption" security schemes. This raises the prospect of multiple different paths to/from system memory that the processor will have to support. FIG. 5 shows an exemplary depiction of such flows.

As observed in FIG. 5, a first path 501 corresponds to a nominal read and write request path in which neither security scheme is enabled and read and write requests simply pass through to the memory controller. A second path 502 corresponds to the response path for requests that follow path 501. As observed in FIG. 5, path 502 is traversed to provide read data or to confirm a successful write (if the applicable memory interface sends such acknowledgements) when neither of these security schemes are enabled.

By contrast, third, fourth, fifth, and sixth paths 503, 504, 505 and 506 correspond to paths that are utilized when a page of content in the EPC is being moved from the EPC to the traditional region of system memory, or, when a thread that is executing out of the EPC issues a read request for a cache line within the EPC.

As observed in FIG. 5, the request for a read of a page from the EPC (e.g., sent from a processing core executing an OS that issues the request) or the request for the read of a cache line from the EPC (e.g., from a processing core that is executing a thread that issues the request (e.g., via a last level cache)) is received at the requestor input and directed along path 503 to the secure enclave protection engine 540.

In response to the request, the secure enclave protection engine 540 issues one or more read requests along path 504 to fetch the meta data for the EPC page/cache line from the EPC. The requested meta data is then provided by the memory controller and directed along path 505 to be processed by the secure enclave protection engine 540. The secure enclave protection engine 540 then processes the meta data. If no active attacks are detected, the secure enclave protection engine issues a read request for the page/cache line along path 504 (a page may require more than one read request) to the memory controller. The requested page/cache line of information is received and decrypted by the enclave protection engine 540. The decrypted information is then directed along path 506 to satisfy the initially received request. Notably, in an alternate embodiment, the secure enclave engine may issue the read request(s) for the data before or concurrently with the request(s) for the meta data such that the read data is processed before confirmation that a passive attack has not occurred.

Paths 503 and 504 are utilized when a page of information is to be moved from the traditional region of system memory to the EPC or when a cache line of information is to be written into the EPC. The former, again, may be received from a processing core that is executing an OS that issues a request for the page movement. The later, may be received from a processing core that is executing a thread executing out of the EPC that issued the request (or by a last level cache).

The information to be written into the EPC is received at the requestor input and directed along path 503 to the secure enclave protection engine 540. The secure enclave protection engine 540 then generates meta data for active attack protection from the received information and encrypts the information. Write requests including the meta data and the encrypted information are then directed along path 504 to the memory controller (e.g., a first one or more requests may be for the meta data, a second request may be for a cache line or a second one or more requests may be for a page of information). Upon a successful write of the information, if the memory interface generates acknowledgements, acknowledgements for the meta data may be directed along path 505 while acknowledgments for the data may be directed along path 502.

In various embodiments, a read request to the memory controller for information to be entered into an EPC and a write request to the memory controller to write information that is being evicted from an EPC may be issued by a memory management unit (MMU) associated with an instruction execution pipeline that is executing the instructions for the thread that is using the EPC. Alternatively a direct memory access (DMA) engine associated with the EPC may issue these requests. In either case the MMU/DMA, in an embodiment, is responsive to an instruction executed by the pipeline to cause the EPC content changes reflected in the read and write operations to happen.

Seventh and eight paths 507, 508 corresponds to a write request path when data (e.g., a cache line of program code or data) is to be written to the traditional region of system memory (e.g., because of a last level cache snoop miss) when the processor is in a "total memory encryption" mode of operation. As observed in FIG. 5, the data to be written out to system memory is first routed along path 507 to total memory encryption engine 550 which encrypts the data. After the data is encrypted by the total memory encryption engine 550, the encrypted data is forwarded along path 508 to the memory controller to be written into the traditional region system memory. An acknowledgement of the successful write, if one is generated, can use path 502.

Paths 507, 508, 509 and 510 correspond to a read response path for a "total memory encryption" mode of operation when encrypted content (e.g., a cache line) in the traditional region of system memory is to be read from the traditional region of system memory, decrypted and provided to the requesting agent that issued the initial read request for the data (e.g., a last level cache or processing core that is executing a thread that is using the total memory encryption mode). As observed in FIG. 5, the read request is first received at the requestor input and directed along path 507 to the total memory encryption engine 550. The total memory encryption engine 550 starts the generation of a cryptographic pad and issues a read request along path 508. The returned information from the memory controller is directed along path 509 to the total memory encryption engine which decrypts the information. The decrypted information is then directed along path 510 to satisfy the original request.

Figure 6:
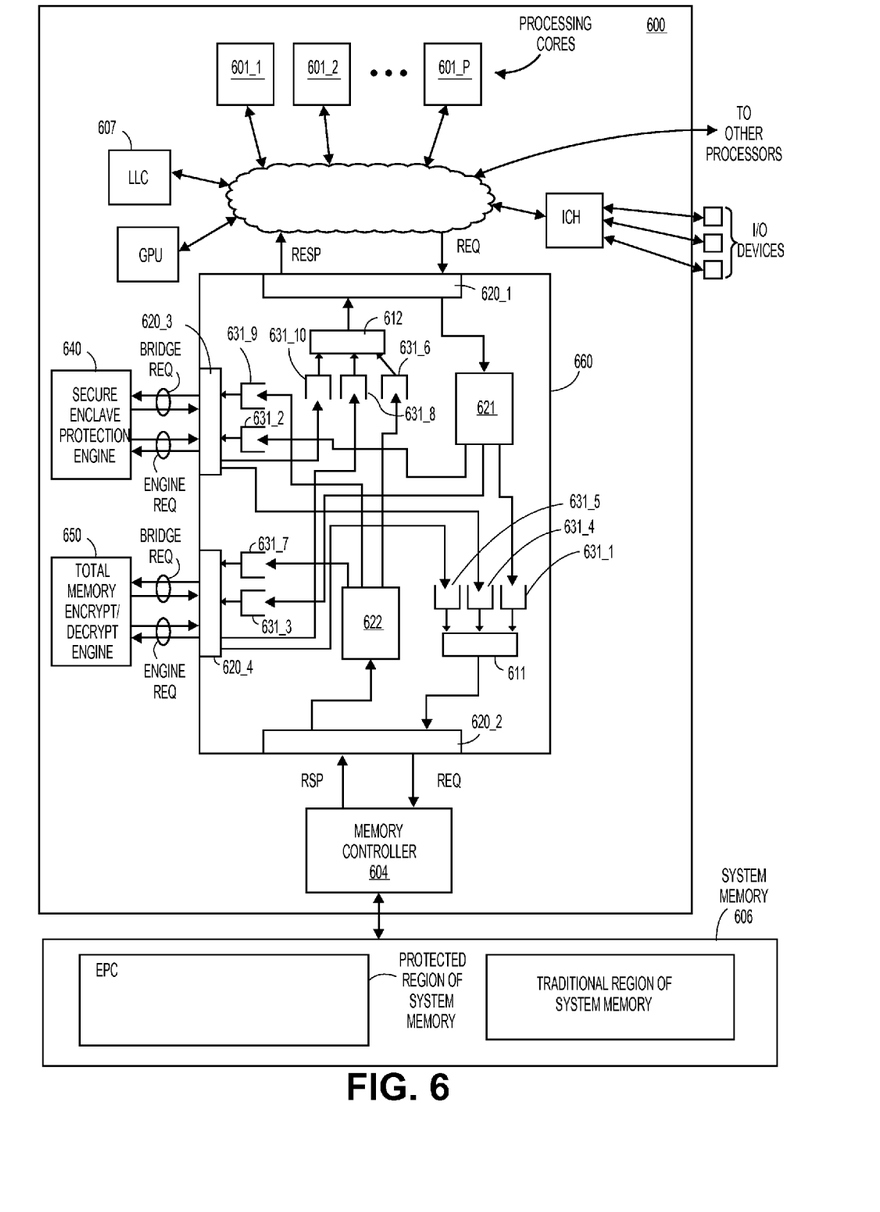
FIG. 6 shows an embodiment of bridge circuitry.

FIG. 6 shows a processor 600 having bridge circuitry 660 designed to implement the pathways of FIG. 5 between N processing cores 601_1 through 601_N, a last level cache 607, a secure enclave protection engine 640, a total memory encryption engine 650 and a memory controller 604 that services requests directed to a system memory 606. In an implementation, all components within the processor 600 are integrated on the same semiconductor chip. In other implementations the system memory 606 is integrated in the same package along with the semiconductor chip containing the processor 600. In another implementation even the system memory 606 is integrated on the same semiconductor chip along with the processor 600.

The bridge circuitry 660 includes interfaces 620_1 through 620_4 and queues 630_1 through 630_10 that preserve the semantics as between the requestors and the memory controller 604. Specifically, as observed in FIG. 6, any of the processing cores 601_1 through 601_N and the last level cache 607 can act as requesters that direct memory access requests to the bridge circuitry 660 through the request side of interface 620_1. Interfaces 620_3 and 620_4 are interfaces between the bridge 660 and the engines 640, 650, respectively. AS observed in FIG. 6, both of these interfaces can be broken down into two separate "request/response" interfaces. A first of these ("bridge request") is used when the bridge 660 initiates a request to the engine. A second of these ("engine request") is used when the engine initiates a request to the bridge 660. Request/response sessions can be concurrently transacted on both the "bridge request" and "engine request" sides of a same one of interfaces 640, 650.

Request logic 621 receives these requests and determines which, if any, of the engines 640, 650 are to be invoked. The request logic 621 then enters the request in an appropriate queue. In an embodiment, whether or not a request invokes one of the engines 640, 650 and if so which one is determinable from a field in the request. In another approach, the system memory address of the request is used to make the determination. In this case, the request logic 621 is programmed (e.g., has internal register space) to record which system memory address ranges correspond to EPC region, which system memory address regions correspond to total memory encryption regions and which system memory address regions do not utilize either protection.

If the request logic 621 determines that the incoming request does not invoke either engine 640, 650 the request is forwarded to queue 631_1. In this case, the request may be, e.g., be a read or write request for a cache line for a core or thread that is not implementing either secure enclave protection or total memory encryption. In an alternate or combined implementation, another path (not depicted) bypasses around queue 631_1 so that requests that do not involve either engine 640, 650 can be (e.g., optionally) sent directly to the memory controller.

If the request logic 621 determines that the incoming request invokes the secure enclave engine 640, the request logic 621 forwards the request to queue 631_2. In this case, the request may be, e.g., a read or write request for a cache line used by a thread that is executing out of the EPC, or, a read or a write request for a page of information that is targeted to move between an EPC and system memory. The request is ultimately sent to the secure enclave engine 640 via the "bridge request" side of interface 620_3.

If the request logic 621 determines that the incoming request invokes the total memory encryption engine 650, the request response logic 621 forwards the request to queue 631_3. In this case, the request may be, e.g., a read or write request for a cache line used by a thread that uses total memory encryption. The request is ultimately sent to the total memory encryption engine 640 via the "bridge request" side of interface 620_4.

If the secure enclave engine 640 receives a write request from the "bridge request" side of interface 620_3 it generates meta data and encrypts the information to be written. Write requests for the meta data and the encrypted information are then passed through the "engine request" side of interface 620_3 and forwarded to queue 631_4.

If the secure enclave engine 640 receives a read request from the "bridge request" side of interface 620_3, the secure enclave engine generates read request(s) for the meta data for the requested information and passes these request(s) through the "engine request" side of interface 620_3 for entry in queue 631_4. The secure enclave engine 640 also generates a read request for the requested information and passes the read request through the "engine request" side of interface 620_3 for entry in queue 631_4. The read request for the requested read information may be issued along with or even before the read requests for the meta data. Alternatively the requests for the requested read information may not be issued until the meta data has been received and processed by the secure enclave engine 640 and a determination has been made by the secure enclave engine 640 that an active attack has not occurred.

If the total memory encryption engine 650 receives a write request from the "bridge request" side of interface 620_4 it encrypts the information to be written. A write request for the encrypted information is then passed through the "engine request" side of interface 620_4 and forwarded to queue 631_5.

If the total memory encryption engine 650 receives a read request from the "bridge request" side of interface 620_4, the total memory encryption engine 640 starts an encryption pad for the requested information and generates a read request for the requested information. The read request generated by the total memory encryption engine 640 passes through the "engine request" side of interface 620_4 for entry in queue 631_5.

Arbiter 611 determines when requests are serviced from queue 631_1, 631_4 or 631_5. Any request serviced from these queues is forwarded to the request side of interface 620_2 for presentation to the memory controller 604.

Responses from the memory controller 604 are received on the response side of interface 620_2 and analyzed by response logic 622. In an embodiment, requests that were entered into any of queues 631_1, 631_4, 631_5 are tagged with information indicating where their associated responses from the memory controller are to be directed (the secure enclave protection engine 640, the total memory encryption engine 650 or neither engine). Response logic 622 tracks this information and the responses (e.g., with a memory request transaction ID) in order to route the responses from the memory controller to the correct destination.

If the response logic 622 determines the response does not invoke either engine 640, 650 it enters the response in queue 631_6. In an alternate or combined implementation, a bypass path (not depicted) circumvents queue 631_6 so that responses from the memory controller that do not invoke either engine 640, 650 can (e.g., optionally) be passed directly to the requester.

If the response logic 622 determines the response invokes the total memory encryption engine 650 it forwards the response to queue 631_7. The response eventually passes through the "bridge request" side of interface 620_4. The total memory encryption engine 650 receives the response. In this particular case the response is for a read request and includes encrypted information read from system memory. The total memory encryption engine 650 decrypts the information and passes it through the "engine request" side of interface 620_4. The decrypted information is then forwarded to queue 631_8.

If the response logic 622 determines the response invokes the secure enclave engine 640 it forwards the response to queue 631_9. The response eventually passes through the "bridge request" side of interface 620_3. The secure enclave engine 640 receives the response. The response may be requested meta data associated with a read request or the encrypted requested information itself. In the case of the later the secure enclave engine 640 will process the meta data to see if an active attack has occurred. In the case of the later the secure enclave engine 640 will decrypt the information and direct the decrypted information through the "engine request" side of interface 620_3. The decrypted information is then forwarded to queue 631_10.

Arbiter 612 determines which responses in queues 631_6, 631_8 and 631_10 are issued from the response side of interface 620_1.

Note that, conceivably, the bridge design can be extended to include other interfaces like interfaces 620_3 and 620_4 to coupled to other engines (e.g., another compression engine). Additional queues may be added as appropriate to expand the routing capabilities of the bridge and the request and response logic may be additionally enhanced to provide for the routing to the additional engine.

Although the request and response logic 621, 622 can be implemented entirely/largely in dedicated electronic hardware circuitry (e.g., hardwired and/or programmable logic circuitry) alternate embodiments may choose to employ microcontrollers or other forms of executed program code solutions (e.g., firmware). As such various methods described above may be implemented in program code that is stored on a tangible machine readable medium. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

A processor is described that includes: one or more processing cores; a memory controller to interface with a system memory having a protected region and a non protected region; a protection engine to protect against active and passive attacks; an encryption/decryption engine to protect against passive attacks; bridge circuitry coupled between the memory controller and the one or more processing cores, the bridge circuitry also coupled to the protection engine and the encryption/decryption engine, the bridge circuitry to route first requests directed to the protected region to the protection engine and to route second requests directed to the non protected region to the encryption/decryption engine. In an embodiment bridge circuitry includes an interface to receive the first requests and the second requests. In an embodiment the first requests include requests to move information from the protected region to the non protected region and move information from the non protected region to the protected region. In an embodiment the protection engine includes a second encryption/decryption engine. In an embodiment the protection engine generates meta data for information to be written into the protected region, the meta data used to detect active attacks upon the information. In an embodiment the bridge circuitry is coupled between the memory controller and a last level cache for the processing cores.

A method is described that includes receiving a first request to write first information into a protected region of system memory; routing the first request to a protection engine, the protection engine encrypting the first information to generate first encrypted information, the protection engine generating meta data for detecting passive attacks upon the encrypted information; routing the first encrypted information and the meta data to a memory controller to write the first encrypted information and the meta data into the protected region of the system memory; receiving a second request to write second information into a non protected region of the system memory; and, routing the second request to an encryption/decryption engine, the encryption/decryption engine encrypting the second information to generate second encrypted information; routing the second encrypted information to the memory controller to write the second encryption information into the non protected region of system memory.

In an embodiment the method further includes: receiving a third request to read the first encrypted information; routing the third request to the protection engine, the protection engine generating one or more read requests for the meta data; routing the one or more read requests to the memory controller, the memory controller reading the meta data. In an embodiment the method further includes routing the meta data to the protection engine, the protection engine processing the meta data to determine if the first encrypted information has experienced an active attack. In an embodiment the method further includes: the protection engine decrypting the first encrypted information if the first encrypted information has not experienced an active attack. In an embodiment the first request is part of a move of the first information from the non protected region of system memory to the protected region of system memory. In an embodiment the method further includes: receiving a fourth request to read the second encrypted information; routing the fourth request to the encryption/decryption engine, the encryption/decryption engine starting an encryption/encryption pad to decrypt the second encrypted information.

A computing system is described that includes: a system memory comprising a protected region and a non protected region; a processor comprising: i) one or more processing cores; ii) a memory controller coupled to the system memory; iii) a protection engine to protect against active and passive attacks; iv) an encryption/decryption engine to protect against passive attacks; v) bridge circuitry coupled between the memory controller and the one or more processing cores, the bridge circuitry also coupled to the protection engine and the encryption/decryption engine, the bridge circuitry to route first requests directed to the protected region to the protection engine and to route second requests directed to the non protected region to the encryption/decryption engine. In an embodiment the bridge circuitry includes an interface to receive the first requests and the second requests. In an embodiment the first requests include requests to move information from the protected region to the non protected region and move information from the non protected region to the protected region. In an embodiment the protection engine includes a second encryption/decryption engine. In an embodiment the protection engine generates meta data for information to be written into the protected region, the meta data used to detect active attacks upon the information. In an embodiment the bridge circuitry is coupled between the memory controller and a last level cache for the processing cores. In an embodiment the one or more processing cores include an instruction execution pipeline that is able to execution an instruction to move information from the protected region to the non protected region. In an embodiment the one or more processing cores include an instruction execution pipeline that is able to execution an instruction to move information from the non protected region to the protected region.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A processor comprising:
   one or more processing cores;
   a memory controller to interface with a system memory having a first region and second region;
   a secure enclave protection engine to protect against both passive and active attacks by encrypting and decrypting data stored in the first region and providing a message authentication code for memory requests to the first region, wherein requests to be routed to the secure enclave protection engine include requests to move information from said first region to said second region and move information from said second region to said first region and wherein the message authentication code is stored in the first region;
   a total memory encryption and decryption engine to protect only against passive attacks by encrypting an decrypting data stored in the second region;
   and bridge circuitry coupled between said memory controller and said one or more processing cores, said bridge circuitry also coupled to said secure enclave protection engine and said total memory encryption and decryption engine, said bridge circuitry to route memory requests to each of the secure enclave protection engine and the total memory encryption and decryption engine based on a type of each memory request.

2. The processor of claim 1 wherein said bridge circuitry includes an interface to receive the memory requests.

3. The processor of claim 1 wherein said secure enclave protection engine includes a second encryption and decryption engine.

4. The processor of claim 1 wherein said secure enclave protection engine generates meta data for information to be written into said first region, said meta data used to detect active attacks upon said information.

5. The processor of claim 1 wherein said bridge circuitry is coupled between said memory controller and a last level cache for said processing cores.

6. The processor of claim 1, wherein the bridge circuitry is to route third requests to the second region without passing through either of the secure enclave protection engine and the total memory encryption and decryption engine.

7. A method comprising:
   receiving at bridge circuitry a first request to access first information in a first region of a system memory;
   routing with the bridge circuitry said first request to a secure enclave protection engine to protect against both passive and active attacks by encrypting and decrypting data stored in the first region and providing a message authentication code for the first request to the first region, wherein the first request routed to the secure enclave protection engine can include requests to move information from said first region to said second region and move information from said second region to said first region and wherein the message authentication code is stored in the first region;
   receiving at the bridge circuitry a second request to access second information in a second region of said system memory; and routing with the bridge circuitry said second request to a total memory encryption and decryption engine to protect only against passive attacks by encrypting and decrypting for the second request to the second region.

8. The method of claim 7 wherein said method further comprises: generating the message authentication code as meta data for the first request.

9. The method of claim 8 further comprising: routing with the bridge circuitry said meta data to said secure enclave protection engine, said secure enclave protection engine processing said meta data to determine if said first information was modified while stored in the first region.

10. The method of claim 7 wherein said method further comprises: receiving at the bridge circuitry a third request to access said second region; and routing with the bridge circuitry said third request to the second region without passing through either of the total memory encryption and decryption engine and the secure enclave protection engine.

11. A computing system comprising:
    a system memory comprising a first region and a second region;
    a processor comprising one or more processing cores; a memory controller coupled to said system memory;
    a secure enclave protection engine to protect against both passive and active attacks by encrypting and decrypting data stored in the first region and providing a message authentication code for memory requests to the first region, wherein requests to be routed to the secure enclave protection engine include requests to move information from said first region to said second region and move information from said second region to said first region and wherein the message authentication code is stored in the first region;
    a total memory encryption and decryption engine to protect only against passive attacks by encrypting and decrypting data stored in the second region;
    and bridge circuitry coupled between said memory controller and said one or more processing cores, said bridge circuitry also coupled to said secure enclave protection engine and said total memory encryption and decryption engine, said bridge circuitry to route memory requests to each of the secure enclave protection engine and the total memory encryption and decryption engine based on a type of each memory request.

12. The computing system of claim 11 wherein said bridge circuitry includes an interface to receive the memory requests.

13. The computing system of claim 11 wherein said secure enclave protection engine generates the message authentication code as meta data for information to be written into said first region.

14. The computing system of claim 11 wherein said bridge circuitry is coupled between said memory controller and a last level cache for said processing cores.

15. The computing system of claim 11 wherein said one or more processing cores include an instruction execution pipeline to execute an instruction to move information between said first region and said second region.

16. The computing system of claim 11, wherein the bridge circuitry is to route third requests to the second region without passing through either of the secure enclave protection engine and the total memory encryption and decryption engine.

* * * * *